United States Patent Office 3,813,422
Patented May 28, 1974

3,813,422
SURFACE MODIFIER FOR SYNTHETIC HIGH POLYMERS
Hideo Marumo, 5-4 Nishikuba 3-chome, Musashino-shi, Tokyo 180, Japan
No Drawing. Filed July 22, 1971, Ser. No. 165,355
Claims priority, application Japan, July 23, 1970, 45/64,552; May 10, 1971, 46/30,394
Int. Cl. C07c *101/26;* C07f *3/06, 7/22*
U.S. Cl. 260—429 R                                13 Claims

ABSTRACT OF THE DISCLOSURE

Certain compounds having specific chemical formula and belonging to the category of amphoteric surface active agents which are metal (other than alkali metal) or amine derivatives of hydroxyalkoxyhydrocarbylamines or quaternary ammonium hydroxides or derivatives thereof having one or more of the hydroxyl groups of the hydroxyalkoxy portion of the molecule replaced by carboxymethoxy and/or having a carboxymethyl group attached to a nitrogen atom and which are capable of making wholesale improvement of various surface properties of synthetic high polymers such as man-made fibers, plastics, paints and printing inks. Said various surface properties of synthetic high polymers that can be improved together by the said compounds include wettability, anti-stain, anti-soil, soil-release, cleanability, anti-fog, adhesion, dyeability, color fastness of dyed fibers, hygroscopicity, lubrication, softness and flexibility, mold releasability, anti-block, anti-tack, antistatic, dispersion, stability to light, antioxidation, and other surface properties.

BACKGROUND OF THE INVENTION

(a) Field of the invention

The present invention is concerned with surface modifiers for synthetic high polymers such as man-made fibers, plastics, paints and printing inks, and more particularly, it relates to surface modifiers which are capable of effecting wholesale improvement of various surface properties of synthetic high polymers by the inclusion therein of a specific compound.

(b) Description of the prior art

Recently, synthetic high polymers have found a broader range of use year after year. Along with this, however, there have been encountered a number of problems concerning difficulties in their actual use in various industrial fields owing to the surface properties of these synthetic high polymers. It is known, on the other hand, that many of these problems can be alleviated by appropriately controlling the surface properties of the synthetic high polymers, or in other words by appropriately controlling the following three basic natures thereof which are: wettability, lubrication and surface polarity. It should be noted, however, that those surface modifiers which have been used in the past were effective only for certain purposes. Not only were those prior surface modifiers unuseful for the improvement of the properties, other than a particular one, of such polymers but also they even deteriorated, in some cases, those other properties of the ploymers. Let us now consider, for example, the antistatic property of synthetic high polymers. There have been proposed various kinds of antistatic agents. However, these prior antistatic agents have been useful only in imparting the antistatic property to such polymers. This donation of antistatic property to the said polymers was accompanied by the undesirable development of surface tackiness and/or deterioration of adhesion. On the other hand, in case a plurality of different modifying agents each having a specific modifying ability different from each other, for example an antistatic agent and an anti-fog agent, were included in a certain synthetic high polymer to improve simultaneously two or more natures of the polymer by having these surface modifiers display individually their own modifying abilities, it was impossible to obtain the desired satisfactory effects from these individual modifying agents. In the worst cases, the two or more modifiers included in a single synthetic high polymer served only to diminish or even kill their modifying abilities.

SUMMARY OF THE INVENTION

It is, therefore, an object of the present invention to provide new surface modifiers which are capable of effecting wholesale improvement of various surface properties of synthetic high polymers. In other words, the present invention contemplates the provision of modifiers which can make, at the same time, an improvement of such surface properties of synthetic high polymers as wettability, anti-stain, anti-soil, soil-release, cleanability, anti-fog, adhesion, dyeability, color fastness of dyed fibers, hygroscopicity, lubrication, softness and flexibility, mold releasability, anti-block, anti-tack, antistatic, dispersion, stability to light, antioxidation, and other surface properties.

Another object of the present inventon is to provide new surface modifiers which can improve various surface properties of substantially all kinds of synthetic high polymers without being undesirably greatly affected depending on the type of such poylmers which are to be improved of their surface properties.

Still another object of the present invention is to provide new surface modifiers for synthetic high polymers, which can be included therein in any desired stage, i.e., not only at the time the synthetic high molecular weight substances are manufactured by polymerization, but also in the stage where the polymerization has progressed to a certain extent, or at the time of molding after polymerization, and furthermore to provide such new surface modifiers which can be used in the form of solution for the surface treatment of the molded synthetic high polymers.

These and other objects, features and advantages of the present invention will be understood more clearly by reading the following detailed description of the invention in conjunction with the preferred embodiments.

DESCRIPTION OF THE PREFERRED EMBODIMENTS

The present invention concerns new surface modifiers for synthetic high polymers, which are capable of imparting a plurality of desired excellent surface properties, at the same time, to the synthetic high polymers by including—in a synthetic high polymer either at the time the polymer is prepared or at the time a synthetic high polymer is subjected to a surface treatment with a resin—a compound expressed by the general formula:

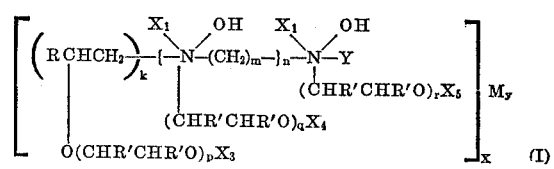

wherein:

R represents a hydrocarbon group having 4-26 carbon atoms;
R' represents either a hydrogen of a lower alkyl group;
$p, q, r, s$ each represents an integer ranging from 0 to 100, preferably 0-50;
$k$ represents an integer 1 or 2;
$m$ represents an integer 1-3;
$n$ represents an integer 0 or 1-2;

Y represents either $(CHR'CHR'O)_sX_6$ or $$RCH-CH_2-$$
$$\ \ \ \ |$$
$$O(CHR'CHR'O)_pX_5;$$

$X_1, X_2, X_3, X_4, X_5, X_6$ each represents either hydrogen or $(CH_2)_lCOO$ wherein: $l$ represents an integer 1–3; however at least one of $X_1, X_2, X_3, X_4, X_5, X_6$ required to be $(CH_2)_lCOO$; there may be an instance where $X_1, X_2$ are neither hydrogen nor $(CH_2)_lCOO$; however, in cases $X_1, X_2$ are neither hydrogen nor $(CH_2)_lCOO$, there is present no OH group which is bonded to nitrogen atom;

M represents an organic amine or a metal other than alkali metals; and $x, y$ each represents an integer determined by the valency of the metal when M is a metal.

According to the present invention, hydroxyalkyl amines are prepared first by a reaction between a 1,2-epoxy alkane and diethanol amine, monoethanol amine, ethylene diamine, diethylene amine or propylene diamine. Then, to the resultant hydroxyalkyl amine is introduced a carboxylic acid to modify the said amine to an amphoteric surface active agent. This modification of these various kinds of amines is prepared by, for example, (A) a reaction between monochloroacetic acid and a hydroxyalkyl amine produced from the said reaction between diethanol amine or monoethanol amine and a 1,2-epoxy alkane; and (B) a reaction between methyl acrylate and hydroxyalkyl amine produced from the said reaction between ethylene diamine, diethylene diamine or propylene diamine and a 1,2-epoxy alkane.

However, a hydroxyalkyl amine obtained from a reaction between monoethanol amine and a 1,2-epoxy alkane may be reacted with methyl acrylate to attain the same purpose. Also, a hydroxyalkyl amine obtained according to the method (B) may be reacted with monochloroacetic acid to obtain the same object.

More specifically, the above-stated methods are described in further detail as follows.

The compounds which are expressed by the above-mentioned general formula (I) are obtained according to the methods described as follows;

(A) 1 mol of diethanol amine was heated to 100° C. while being stirred. To this heated diethanol amine (or monoethanol amine) was added, in drops, 1 mol of a 1,2-epoxy alkane, consuming about 1 hour. The resulting product of reaction was added with 0.5% by weight of NaOH (sodium hydroxide). The mixture was then heated at 200° C. while being stirred. Then, 3 mols of ethylene oxide were added thereto by blowing. To the resulting adduct of ethylene oxide was added equal mols of NaOH. Furthermore, β-isopropyl alcohol was added thereto in an amount same as that of the ethylene oxide adduct and the latter was dissolved therein. Then, a 30% aqueous solution of sodium monochloroacetate was added thereto and the mixture was stirred at 80° C. for 1 hour. NaCl formed was fitered out therefrom. To the resulting filtered liquid was added a 30% aqueous solution of CaCl₂, and the mixture was stirred at 80° C. for 30 minutes. After distilling out both water and alcohol therefrom, toluene was added to the remainder to produce a 50% toluene solution. By desalting and refining this solution, the desired product was obtained.

These chemical processes are expressed as follows:

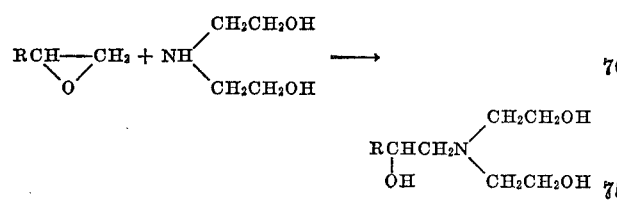

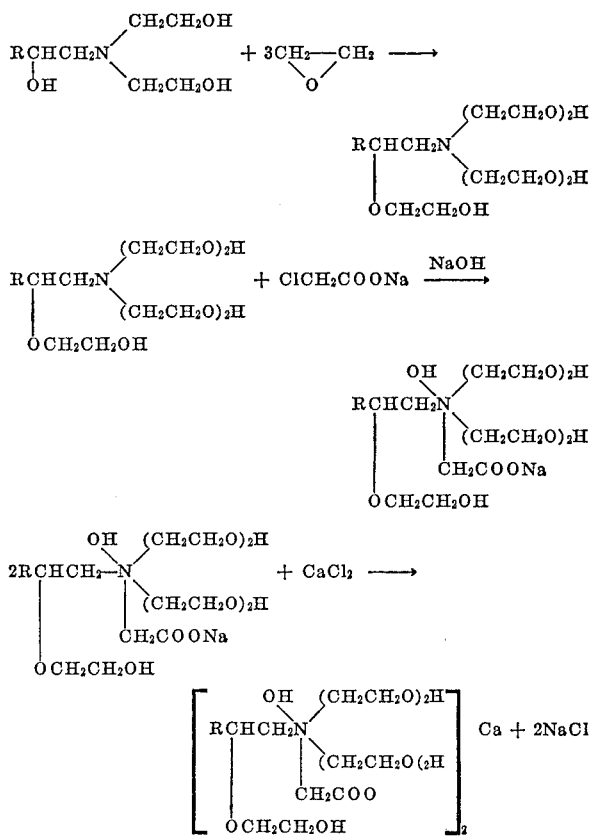

(B) 3 mols of propylene diamine (or ethylene diamine, diethylene triamine) were heated at 70–80° C. while being stirred. To this was added, in drops, 1 mol of a 1,2-epoxy alkane, completing the addition at the end of about 30 minutes. Surplus propylene diamine was distilled out under a reduced pressure. To this reaction product was added, in drops, equal mols of methyl acrylate at 70–80° C. After completion of dropping, the mixture was stirred continuously for 5 hours at the same temperature. The resulting adduct of reaction was added with water in amount 4 times that of the said reaction adduct, and also with 1.1 mols of NaOH. This mixture was then heated at 90–100° C. while being stirred to saponify it. The saponified product was then diluted with water to prepare a 10% aqueous solution. Then, a 10% aqueous solution of MgCl₂ of equal mols was added thereto in drops at 80–100° C. to produce the desired precipitates which then were washed with water 5 times to remove those inorganic substances contained in the precipitates. The resulting precipitates were dried at 80–90° C., and thus the desired product was obtained. The foregoing chemical processes are as follows:

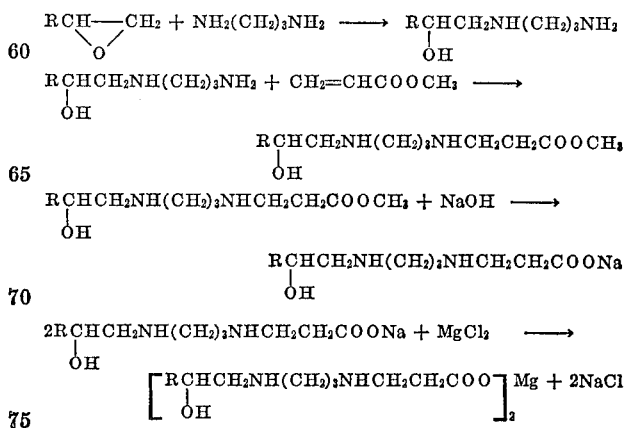

It should be understood, however, that each of the final products obtained from the respective reactions (1) and (2) mentioned above is invariably a metal salt of an amphoteric surface active agent and is a neutral salt. In general, however, the said products can include an acid salt. More specifically, in case the aforesaid neutral salt which is one of the metal salts stated above and which is expressed by the aforesaid general formula (I) is produced by synthesis, there is also present an acid salt expressed by the under-mentioned general formula (I) which is formed also during the said reaction processes. It should be noted that, irrespective of whether the synthetic high polymer modifying agent is composed singly of either the neutral salt among the compounds given by (I) or the acid salt given by (II), or composed in such a way that these two are co-present, there is no appreciable difference whatsoever between the modifying abilities of these three kinds of modifying agents.

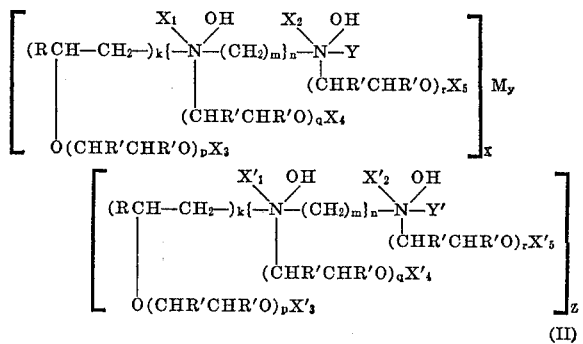

wherein:

$R$ represents a hydrocarbon group having 4–26 carbon atoms;

$R'$ represents either hydrogen or a lower alkyl group;

$p, q, r, s$ each represents an integer 0–100, preferably an integer 0–50;

$k$ represents an integer 1 or 2;

$m$ represents an integer 1–3;

$n$ represents an integer 0 or 1–2;

$Y$ represents either $(CHR'CHR'O)_sX_6$ or

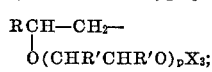

$Y'$ represents either $(CHR'CHR'O)_sX'_6$ or

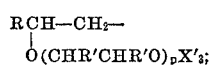

$X_1, X_2, X_3, X_4, X_5, X_6$ each represents either hydrogen or $(CH_2)_lCOO$;

$X'_1, X'_2, X'_3, X'_4, X'_5, X'_6$ each represents either hydrogen or $(CH_2)_lCOOH$, corresponding to $X_1, X_2, X_3, X_4, X_5, X_6$, respectively, wherein: $l$ represents an integer 1–3; however, at least one of $(X_1, X'_1)$, $(X_2, X'_2)$, $(X_3, X'_3)$, $(X_4, X'_4)$, $(X_5, X'_5)$, $(X_6, X'_6)$ is required to be $(CH_2)_lCOO$ and $(CH_2)_lCOOH$; there may be an instance where $(X_1, X'_1)$, $(X_2, X'_2)$, $(X_4, X'_4)$ are neither hydrogen nor $(CH_2)_lCOO$ and $(CH_2)_lCOOH$; however, in case $(X_1, X'_1)$, $(X_2, X'_2)$ are neither hydrogen nor $(CH_2)_lCOO$ and $(CH_2)_lCOOH$, there is present no OH group which is bonded to nitrogen atom;

$M$ represents a metal other than alkali metals; and $x, y, z$ each represents an integer determined by the valency of the metal.

Those synthetic high polymers whose surface properties are improved by the inclusion therein of either one or both of the neutral salt among the compounds given by (I) and the acid salt (II) produced in (I) include polyamide, polyester, polyvinyl chloride, polyvinylidene chloride, polyvinyl alcohol, polyacrylonitrile, polypropylene, polyethylene, polyacrylate, polymethylmethacrylate, polystyrene, their copolymers and their blended substances.

Equally satisfactory modifying effects of the compounds of the present invention can be obtained also from the instance where the above-listed synthetic high polymers to which the said compounds are applied contain a substantial amount of either an inorganic or organic filler.

The modifying effect which is brought about by the compounds of the present invention, i.e. by the surface characteristic modifying components, is never adversely affected greatly by the type of the synthetic high polymer to which these compounds are applied. Modification of the surface properties of the aforesaid respective kinds of synthetic high polymers can be accomplished by selecting the amount of the said compounds which are included in the said polymers so as to lie within the range of 0.05 to 10% by weight, which, industrially, is 0.1–1.0% for polyethylene and polypropylene, 1.5–2.5% for polyamide and polyester, and 1.0–2.5% for polystyrene, polymethylmethacrylate, acrylonitrile-butadiene-styrene copolymer (so-called ABS resin), acrylonitrile-styrene copolymer (so-called AS resin) and polyvinyl chloride. By following these ranges, it is possible to attain the desired improvement of the natures of the respective synthetic high polymers.

The reason for the fact that the compounds which are employed in the present invention can produce equally desirable modifying effect when included in synthetic high polymers irrespective of the type of the polymers to which the compounds are applied and without being greatly adversely affected by the type of the polymer, may be explained as follows. Since the compounds of the present invention may migrate on to the surface of synthetic polymers and there form the closely packed molecular layers with the polar group oriented towards the outer side, the true surface of the said polymer containing this compound is comprised of a layer of molecules of the compound added to the polymer, rather than the synthetic high polymer per se.

Various ways of adding the compounds of the present invention to synthetic high polymers are considered. Typical practices in general, however, are represented by the addition of such a compound at the time of polymerization process to produce a high polymer, i.e., adding the compound to the monomers prior to their being polymerized into a synthetic high polymer, or by the addition of the compound at the stage where polymerization has progressed to a certain degree, or by the addition of the compound at the time of molding after polymerization, or treating the surface of the molded article with a solution of such a compound.

It should be noted also that the compounds of the present invention are almost invariably soluble in organic liquids. Accordingly, it is also possible to add these compounds to paints containing an organic solvent.

Description will hereunder be made of some examples of the present invention.

EXAMPLE 1

To the respective batches each consisting of 100 parts, by weight, of ε-caprolactam were added 5 parts of ω-aminocaproic acid, and 2.5 parts each of the respective compounds (1)–(78) listed below. The resulting mixture was polymerized at 250–260° C. for 10 hours, and thus nylon 6 batches were prepared. The nylon 6 batches thus obtained were then compression molded into films which were measured with respect to: contact angles with water; surface resistivity; half time of leakage of charge impressed with an electrostatic potential of 10,000 volts.

The result of the measurement is shown in Table 1. From this table, it will be noted that the contact angles of these nylon films with water shows a marked decrease in value as a result of the addition of the compounds of the present invention, indicating a marked improvement in their wettability to water. Furthermore, the chargeability of the nylon 6 is noted to have dropped remarkably by the addition thereto of the compounds of the present invention, thus indicating that an excellent antistatic property has been developed.

It should be understood that the (1:1) and (3:1) which appear in the following list of compounds are intended to show the blending proportions of the substance mentioned in the upper row and the substance given therebelow.

(1) $\left[ \begin{array}{c} C_{10}H_{21}CHCH_2NCH_2CH_2OH \\ | \quad\quad | \\ OH \quad\quad CH_2COO \end{array} \right]_2 Ca$ (2) $\left[ \begin{array}{c} C_{16}H_{33}CHCH_2NCH_2CH_2OH \\ | \quad\quad | \\ OH \quad\quad CH_2COO \end{array} \right]_2 Mg$ (3) $\left[ \begin{array}{c} C_{26}H_{53}CHCH_2NCH_2CH_2OH \\ | \quad\quad | \\ OH \quad\quad CH_2COO \end{array} \right]_2 Zn$ (4) $\left[ \begin{array}{c} C_{10}H_{21}CHCH_2NCH_2CH_2OH \\ | \quad\quad | \\ OH \quad\quad CH_2COO \end{array} \right] NH_2(CH_2CH_2OH)_2$ (5) $\left[ \begin{array}{c} C_6H_{13}CHCH_2NCH_2CH_2OH \\ | \quad\quad | \\ OH \quad\quad CH_2COO \end{array} \right]_2 Ca$ $\left[ \begin{array}{c} C_6H_{13}CHCH_2NCH_2CH_2OH \\ | \quad\quad | \\ OH \quad\quad CH_2COO \end{array} \right]_2 Ca \left[ \begin{array}{c} C_6H_{13}CHCH_2NCH_2CH_2OH \\ | \quad\quad | \\ OH \quad\quad CH_2COOH \end{array} \right]_2$ (1:1)

(6) $\left[ \begin{array}{c} C_{16}H_{33}CHCH_2NCH_2CH_2OH \\ | \quad\quad | \\ OH \quad\quad CH_2COO \end{array} \right]_2 Ba$ $\left[ \begin{array}{c} C_{16}H_{33}CHCH_2NCH_2CH_2OH \\ | \quad\quad | \\ OH \quad\quad CH_2COO \end{array} \right]_2 Ba \left[ \begin{array}{c} C_{16}H_{33}CHCH_2NCH_2CH_2OH \\ | \quad\quad | \\ OH \quad\quad CH_2COOH \end{array} \right]_2$ (1:1)

(7) $\left[ \begin{array}{c} C_{22}H_{45}CHCH_2NCH_2CH_2OH \\ | \quad\quad | \\ OH \quad\quad CH_2COO \end{array} \right]_2 Ni$ $\left[ \begin{array}{c} C_{22}H_{45}CHCH_2NCH_2CH_2OH \\ | \quad\quad | \\ OH \quad\quad CH_2COO \end{array} \right]_2 Ni \left[ \begin{array}{c} C_{22}H_{45}CHCH_2NCH_2CH_2OH \\ | \quad\quad | \\ OH \quad\quad CH_2COOH \end{array} \right]_2$ (1:1)

(8) $\left[ \begin{array}{c} C_6H_{13}CHCH_2NCH_2CH_2OH \\ | \quad\quad | \\ OH \quad\quad CH_2COO \end{array} \right]_2 Ca \left[ \begin{array}{c} C_6H_{13}CHCH_2NCH_2CH_2OH \\ | \quad\quad | \\ OH \quad\quad CH_2COOH \end{array} \right]_2$ (9) $\left[ \begin{array}{c} C_{14}H_{29}CHCH_2NCH_2CH_2OH \\ | \quad\quad | \\ OH \quad\quad CH_2COO \end{array} \right]_2 Mn \left[ \begin{array}{c} C_{14}H_{29}CHCH_2NCH_2CH_2OH \\ | \quad\quad | \\ OH \quad\quad CH_2COOH \end{array} \right]$

(10) $\left[ \begin{array}{c} C_{16}H_{33}CHCH_2NCH_2CH_2OH \\ | \quad\quad | \\ OH \quad\quad CH_2COO \end{array} \right]_3 2Al \left[ \begin{array}{c} C_{16}H_{33}CHCH_2NCH_2CH_2OH \\ | \quad\quad | \\ OH \quad\quad CH_2COOH \end{array} \right]_2$

(11) $\left[ \begin{array}{c} \quad\quad OH \\ C_4H_9CHCH_2 \quad OH \\ \quad\quad\backslash\quad / \\ \quad\quad\quad N CH_2CH_2OH \\ \quad\quad/\quad\backslash \\ C_4H_9CHCH_2 \quad CH_2COO \\ | \\ OH \end{array} \right]_2 Ca$

(12) $\left[ \begin{array}{c} \quad\quad OH \\ C_{14}H_{29}CHCH_2 \quad OH \\ \quad\quad\backslash\quad / \\ \quad\quad\quad N CH_2CH_2OH \\ \quad\quad/\quad\backslash \\ C_{14}H_{29}CHCH_2 \quad CH_2COO \\ | \\ OH \end{array} \right]_2 Zn$

(13) $\left[ \begin{array}{c} \quad\quad OH \\ C_{20}H_{51}CHCH_2 \quad OH \\ \quad\quad\backslash\quad / \\ \quad\quad\quad N CH_2CH_2OH \\ \quad\quad/\quad\backslash \\ C_{20}H_{51}CHCH_2 \quad CH_2COO \\ | \\ OH \end{array} \right] NH(CH_2CH_2OH)_2$

(14) $\left[ \begin{array}{c} \quad O(CH_2CH_2O)_5H \\ C_8H_{17}CH \cdot CH_2 \quad OH \\ \quad\quad\backslash\quad\quad/ \\ \quad\quad\quad N \cdot (CH_2CH_2O)_5H \\ \quad\quad/\quad\quad\backslash \\ C_8H_{17}CH \cdot CH_2 \quad CH_2COO \\ | \\ O(CH_2CH_2O)_5H \end{array} \right]_2 Ca$

(15) $\left[ \begin{array}{c} \quad O(CH_2CH_2O)_{15}H \\ C_{16}H_{33}CH \cdot CH_2 \quad OH \\ \quad\quad\backslash\quad\quad/ \\ \quad\quad\quad N \cdot (CH_2CH_2O)_{15}H \\ \quad\quad/\quad\quad\backslash \\ C_{16}H_{33}CH \cdot CH_2 \quad CH_2COO \\ | \\ O(CH_2CH_2O)_{15}H \end{array} \right]_2 Fe$

(16) $\left[ \begin{array}{c} \quad\quad CH_3 \\ \quad\quad | \\ \quad O(CH_2CHO)_{10}H \\ C_{10}H_{21}CH \cdot CH_2 \quad OH \\ \quad\quad\backslash\quad\quad/ \\ \quad\quad\quad N \cdot CH_2CH_2O(CH_2CHO)_{10}H \\ \quad\quad/\quad\quad\backslash \quad\quad\quad | \\ C_{10}H_{21}CH \cdot CH_2 \quad CH_2COO \quad\quad CH_3 \\ | \\ O(CH_2CHO)_{10}H \\ \quad\quad | \\ \quad\quad CH_3 \end{array} \right]_2 Mg$

(17) $\left[ \begin{array}{c} \quad\quad OH \\ C_{14}H_{29}CHCH_2 \quad OH \\ \quad\quad\backslash\quad\quad/ \\ \quad\quad\quad NCH_2CH_2OH \\ \quad\quad/\quad\quad\backslash \\ C_{14}H_{29}CHCH_2 \quad CH_2COO \\ | \\ OH \end{array} \right]_2 Ca$ $\left[ \begin{array}{c} \quad\quad OH \\ C_{14}H_{29}CHCH_2 \quad OH \\ \quad\quad\backslash\quad\quad/ \\ \quad\quad\quad NCH_2CH_2OH \\ \quad\quad/\quad\quad\backslash \\ C_{14}H_{29}CHCH_2 \quad CH_2COO \\ | \\ OH \end{array} \right]_2 Ca \left[ \begin{array}{c} \quad\quad OH \\ C_{14}H_{29}CHCH_2 \quad OH \\ \quad\quad\backslash\quad\quad/ \\ \quad\quad\quad NCH_2CH_2OH \\ \quad\quad/\quad\quad\backslash \\ C_{14}H_{29}CHCH_2 \quad CH_2COOH \\ | \\ OH \end{array} \right]_2$ (3:1)

(18) $\left[ \begin{array}{c} \quad O(CH_2CH_2O)_{15}H \\ C_{10}H_{21}CH \cdot CH_2 \quad OH \\ \quad\quad\backslash\quad\quad/ \\ \quad\quad\quad N \cdot (CH_2CH_2O)_{15}H \\ \quad\quad/\quad\quad\backslash \\ C_{10}H_{21}CH \cdot CH_2 \quad CH_2COO \\ | \\ O(CH_2CH_2O)_{15}H \end{array} \right]_2 Zn$ $\left[ \begin{array}{c} \quad O(CH_2CH_2O)_{15}H \\ C_{10}H_{21}CHCH_2 \quad OH \\ \quad\quad\backslash\quad\quad/ \\ \quad\quad\quad N \cdot (CH_2CH_2O)_{15}H \\ \quad\quad/\quad\quad\backslash \\ C_{10}H_{21}CHCH_2 \quad CH_2COO \\ | \\ O(CH_2CH_2O)_{15}H \end{array} \right]_2 Zn$ $\left[ \begin{array}{c} \quad O(CH_2CH_2O)_{15}H \\ C_{10}H_{21}CHCH_2 \quad OH \\ \quad\quad\backslash\quad\quad/ \\ \quad\quad\quad N \cdot (CH_2CH_2O)_{15}H \\ \quad\quad/\quad\quad\backslash \\ C_{10}H_{21}CHCH_2 \quad CH_2COO \\ | \\ O(CH_2CH_2O)_{15}H \end{array} \right]_2$ (1:2)

(19) $\left[ \begin{array}{c} \quad\quad CH_3 \\ \quad\quad | \\ \quad O(CH_2CHO)_{10}H \\ C_{22}H_{45}CHCH_2 \quad OH \\ \quad\quad\backslash\quad\quad/ \\ \quad\quad\quad N \cdot CH_2CH_2O(CH_2CHO)_{10}H \\ \quad\quad/\quad\quad\backslash \quad\quad\quad | \\ C_{22}H_{45}CHCH_2 \quad CH_2COO \quad\quad CH_3 \\ | \\ O(CH_2CHO)_{10}H \\ \quad\quad | \\ \quad\quad CH_3 \end{array} \right]_2 Mg$

(19) 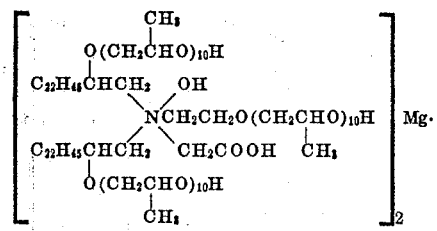
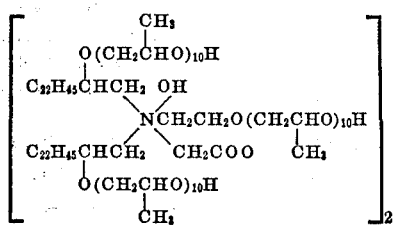
(3:2)
(20) 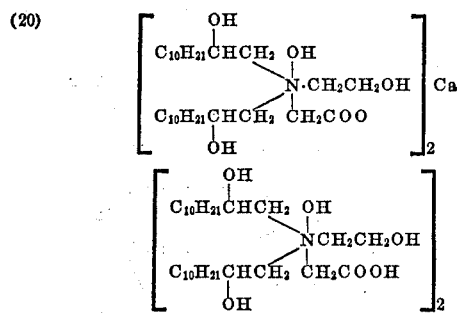
(21) 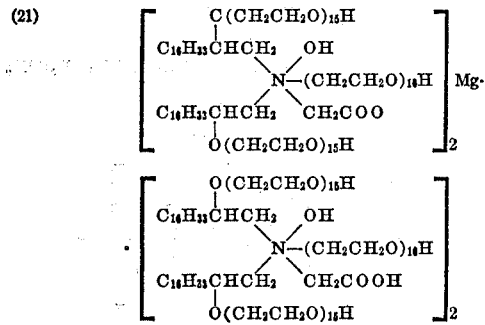
(22) 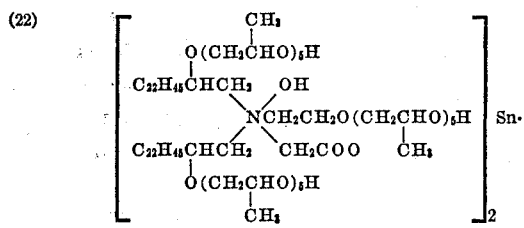
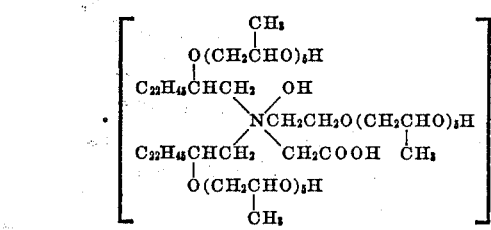
(23) 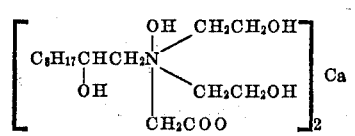
(24) 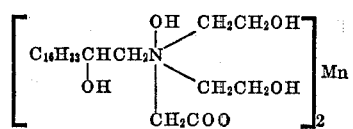
(25) 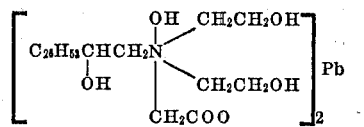
(26) 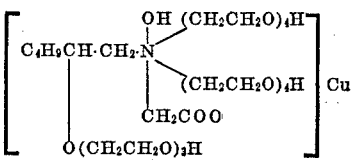
(27) 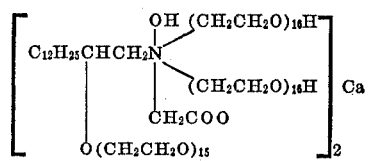
(28) 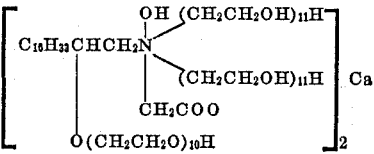
(29) 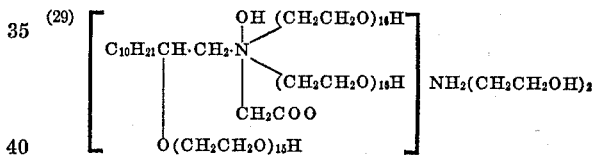
(30) 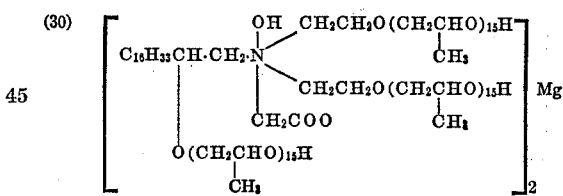
(31) 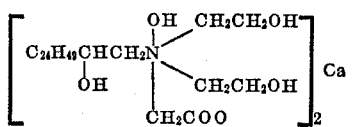
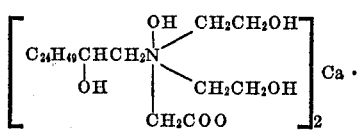
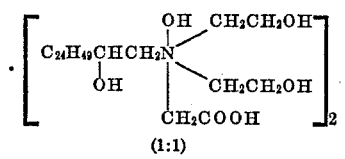
(1:1)
(32) 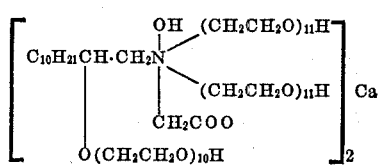

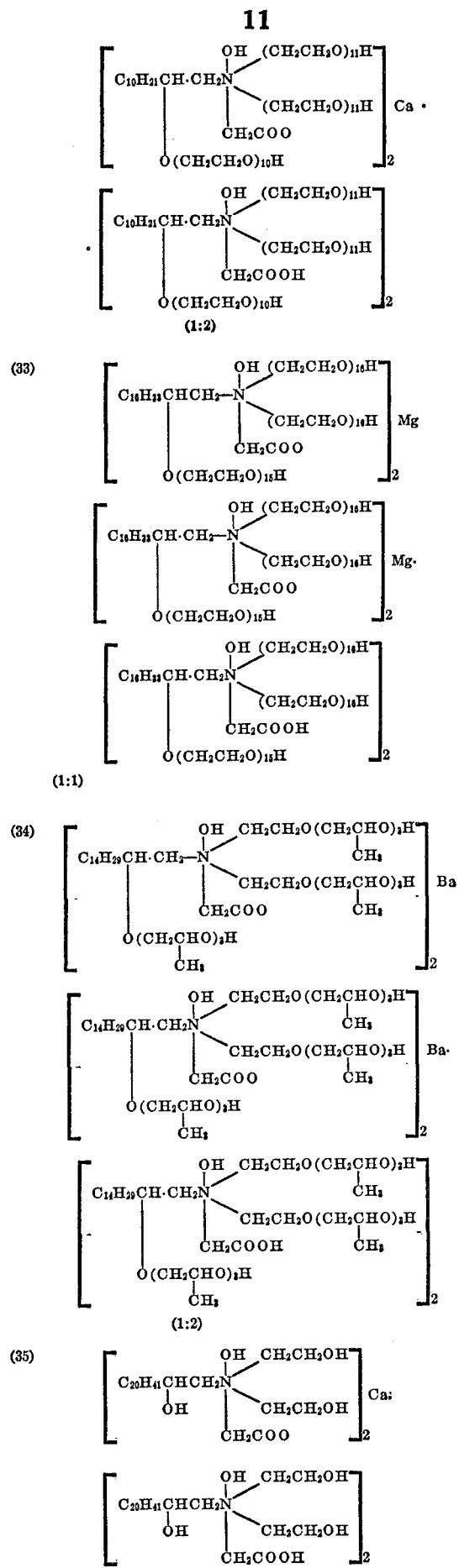
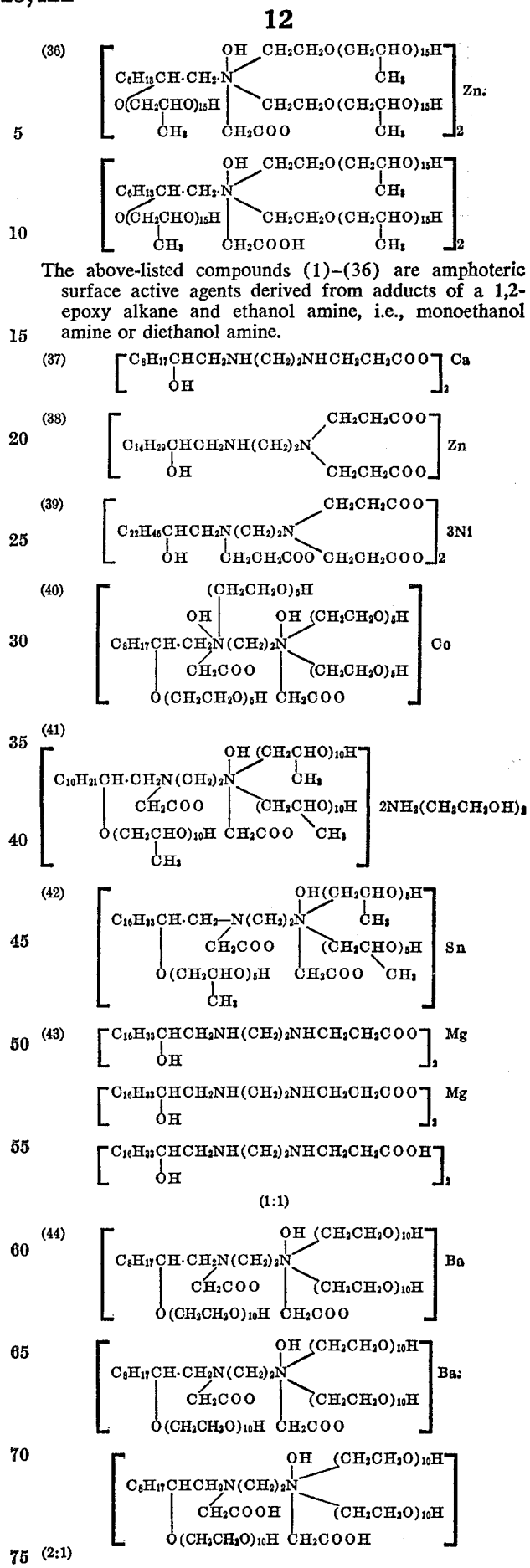
The above-listed compounds (1)–(36) are amphoteric surface active agents derived from adducts of a 1,2-epoxy alkane and ethanol amine, i.e., monoethanol amine or diethanol amine.

(45) [C₁₄H₂₉CH-CH₂N(CH₂)₂N structure with (CH₂CHO)₃H, OH, CH₃, CH₂COO, O(CH₂CHO)₃H, CH₃, CH₂COOCH₃, (CH₂CHO)₃H groups] Ca

[C₁₄H₂₉CH-CH₂N(CH₂)₂N similar structure] Ca·

[C₁₄H₂₉CH-CH₂N(CH₂)₂N similar structure with CH₂COOH] (2:1)

(46) [C₁₆H₃₃CHCH₂NH(CH₂)₂NHCH₂CH₂COO / OH]₂ Mg·

; [C₁₆H₃₃CHCH₂NH(CH₂)₂NHCH₂CH₂COOH / OH]₂

(47) [C₆H₁₃CHCH₂NH(CH₂)₂N(CH₂CH₂COO)₂ / OH] Zn·

; [C₆H₁₃CHCH₂NH(CH₂)₂N(CH₂CH₂COOH)₂ / OH]

(48) [C₂₄H₄₉CHCH₂-N-(CH₂)₂N structure with OH, (CH₂CH₂O)₁₀H, CH₂COO, O(CH₂CH₂O)₁₀H, (CH₂CH₂O)₁₀H] Ca·

; [C₂₄H₄₉CHCH₂-N-(CH₂)₂N similar with CH₂COOH]

(49) [C₂₂H₄₅CHCH₂NH(CH₂)₂N(CH₂CH₂COO)(CH₂CHC₂₂H₄₅OH) / OH]₂ Ca

(50) [C₁₀H₂₁CHCH₃(OH) × 2, N(CH₂)₂N(CH₂CH₂COO)₂] Ni

(51) [C₁₀H₂₁CHCH₂-N-(CH₂)₂N structure with O(CH₂CH₂O)₃H, OH, (CH₂CH₂O)₃H, CH₂COO, O(CH₂CH₂O)₃H] Cu

(52) [C₁₆H₃₃CHCH₃(OH) × 2, N(CH₂)₂NHCH₂CH₂COO]₂ Mg·

[C₁₆H₃₃CHCH₃(OH) × 2, N(CH₂)₂NHCH₂CH₂COO]₂ Mg·

[C₁₆H₃₃CHCH₃(OH) × 2, N(CH₂)₂NHCH₂CH₂COOH]₂ (1:1)

(53) [C₁₆H₃₃CHCH₂(OH) × 2, N(CH₂)₂NHCH₂CH₂COO]₂ Mg·

[C₁₆H₃₃CHCH₂(OH) × 2, N(CH₂)₂NHCH₂CH₂COOH]₂

(54) [C₆H₁₃CHCH₂NH(CH₂)₂NHCH₂CH₂COO / OH] NH₃(CH₂CH₂OH)₃

(55) [C₁₂H₂₅CHCH₂NH(CH₂)₂N(CH₂CH₂COO)₂ / OH] Ca

(56) [C₁₆H₃₃CH·CH₂-N-(CH₂)₂N structure with (CH₂CH₂O)₁₀H, OH, (CH₂CH₂O)₁₀H, CH₂COO, O(CH₂CH₂O)₁₀H] Cu

(57) [C₂₀H₄₁CH·CH₂-N-(CH₂)₂N structure with (CH₂CHO)₁₀H, CH₃, OH, (CH₂CHO)₁₀H, CH₃, CH₂COO, O(CH₂CHO)₁₀H, CH₃, CH₂COOCH₃]

(58) [C₈H₁₇CHCH₂NH(CH₂)₂NHCH₂CH₂COO / OH] Mg

[C₈H₁₇CHCH₂NH(CH₂)₂NHCH₂CH₂COO / OH]₂ Mg·

[C₈H₁₇CHCH₂NH(CH₂)₂NHCH₂CH₂COOH / OH] (1:1)

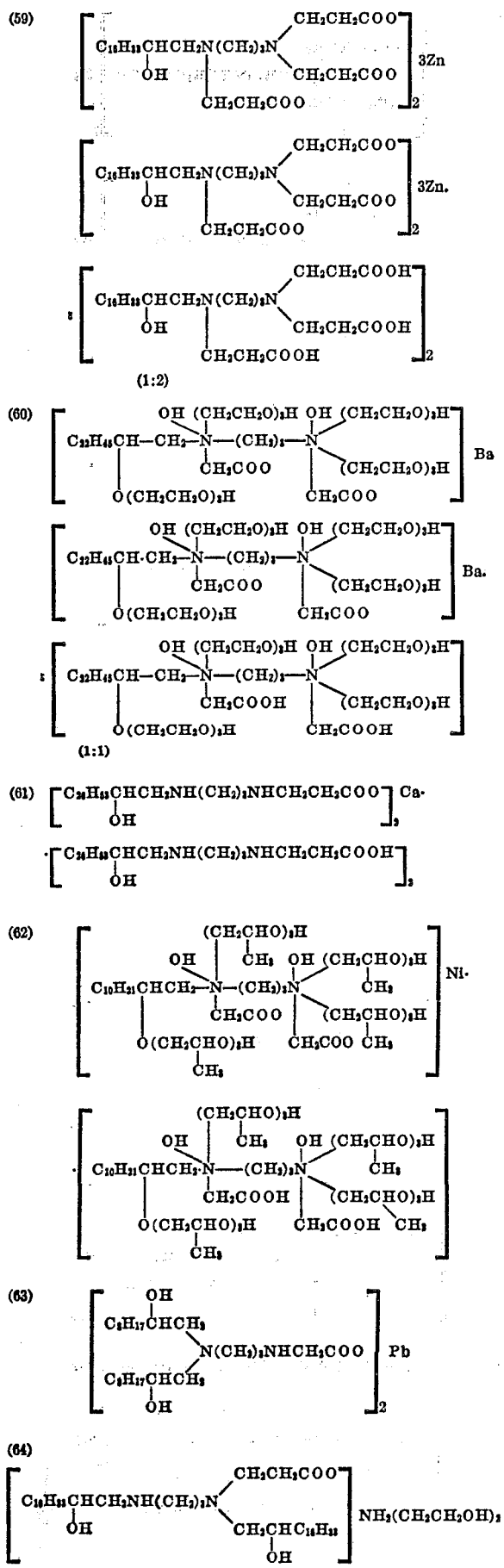

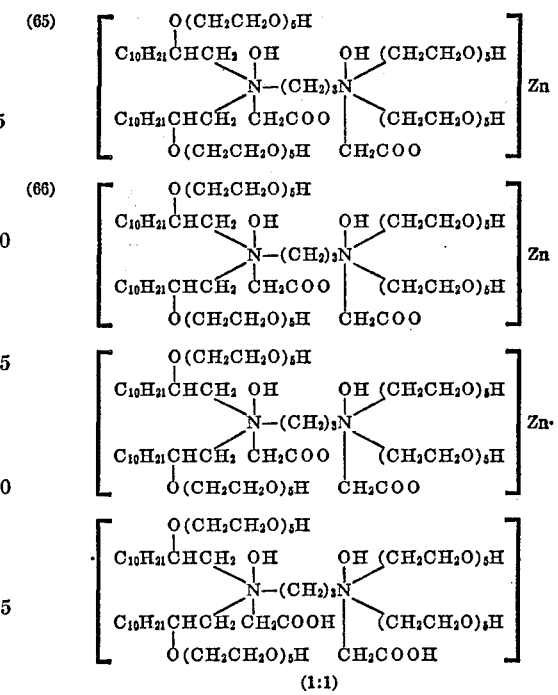

The above-listed compounds (37)–(66) are amphoteric surface active agents derived from adducts of a 1,2-epoxy alkane and an alkylene diamine, i.e., ethylene diamine or propylene diamine.

(67)

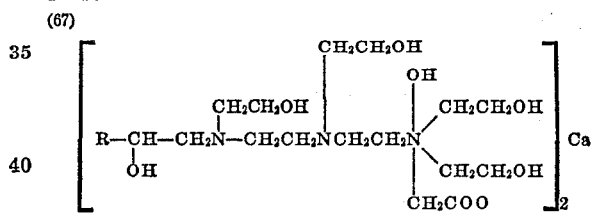

wherein: R represents a mixture of saturated hydrocarbon group having 10–12 carbon atoms.

(68)

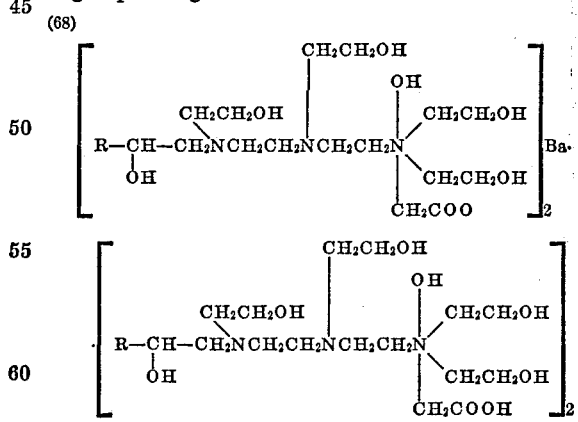

wherein: R represents a mixture of saturated hydrocarbon group having 14–16 carbon atoms.

(69)

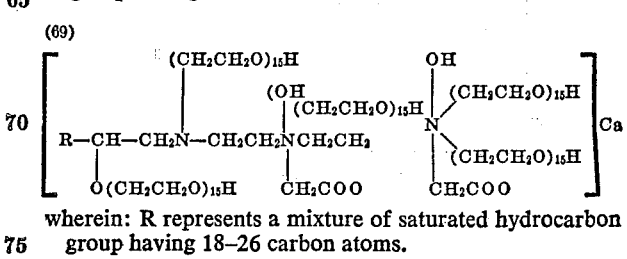

wherein: R represents a mixture of saturated hydrocarbon group having 18–26 carbon atoms.

(70)
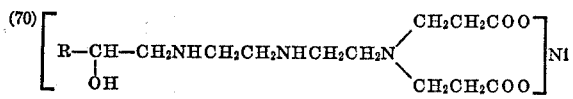

wherein: R represents a mixture of saturated hydrocarbon group having 10–12 carbon atoms.

(71)
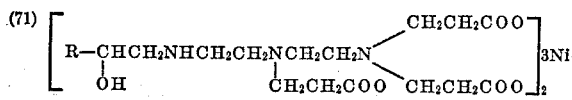

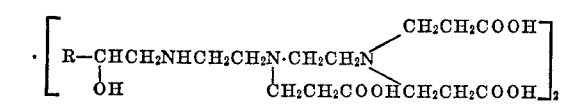

wherein: R represents a mixture of saturated hydrocarbon group having 10–12 carbon atoms.

(72)
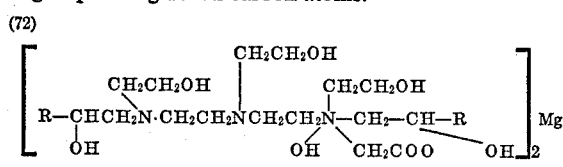

wherein: R represents a mixture of saturated hydrocarbon group having 6–8 carbon atoms.

(73)
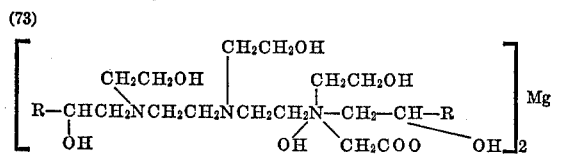

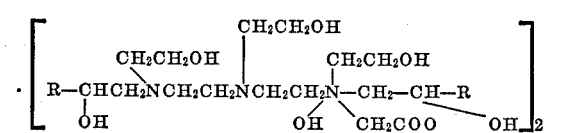

wherein: R represents a mixture of saturated hydrocarbon group having 6–8 carbon atoms.

(74)
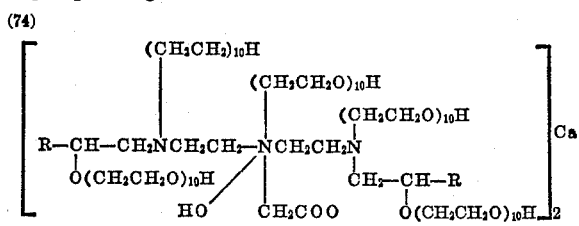

wherein: R represents a mixture of saturated hydrocarbon group having 18–26 carbon atoms.

(75)
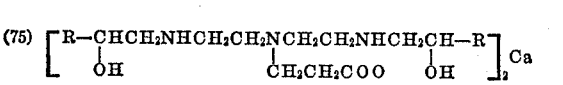

wherein: R represents a mixture of saturated hydrocarbon group having 10–12 carbon atoms.

(76)
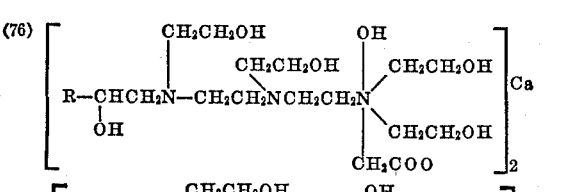

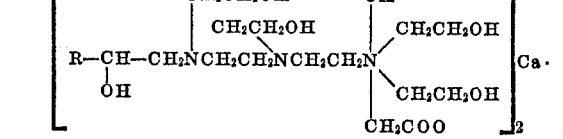

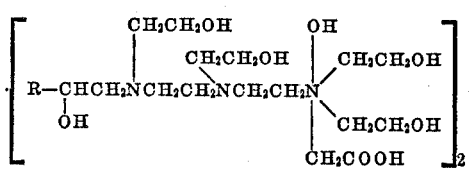

(3:1)

wherein: R represents a mixture of saturated hydrocarbon group having 10–12 carbon atoms.

(77)
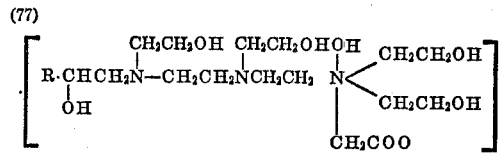

$NH_2(CH_2CH_2OH)_3$ wherein: R represents a mixture of saturated hydrocarbon group having 14–16 carbon atoms.

(78)
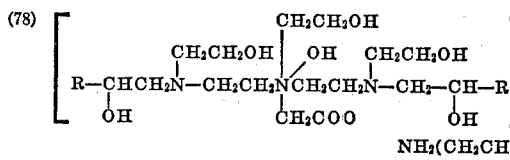

$NH_2(CH_2CH_2OH)_3$ wherein: R represents a mixture of saturated hydrocarbon groups having 14–16 carbon atoms.

The compounds (67)–(78) listed above are amphoteric surface active agents derived from adducts of a 1,2-epoxy alkane and diethylene triamine.

TABLE 1

| Compound number | Contact angle (°) | | Surface resistivity (Ω) | | Half time of leakage (sec.) | |
|---|---|---|---|---|---|---|
| | Direct | Washed 5 times | Direct | Washed 5 times | Direct | Washed 5 times |
| Blank test | 70 | 70 | $>10^{13}$ | $>10^{13}$ | ∞ | ∞ |
| 1 | 30 | 31 | $4.1 \times 10^{11}$ | $4.3 \times 10^{11}$ | 0.2 | 0.2 |
| 2 | 31 | 31 | $1.8 \times 10^{10}$ | $2.6 \times 10^{11}$ | 0.2 | 0.5 |
| 3 | 29 | 30 | $9.0 \times 10^{10}$ | $3.5 \times 10^{11}$ | 0.1 | 0.3 |
| 4 | 32 | 32 | $7.0 \times 10^{11}$ | $5.0 \times 10^{11}$ | 0.3 | 0.5 |
| 5 | 33 | 32 | $4.5 \times 10^{11}$ | $6.0 \times 10^{11}$ | 0.2 | 0.7 |
| 6 | 33 | 33 | $6.0 \times 10^{11}$ | $6.5 \times 10^{11}$ | 0.2 | 0.2 |
| 7 | 30 | 32 | $5.0 \times 10^{11}$ | $6.8 \times 10^{11}$ | 0.1 | 0.2 |
| 8 | 31 | 31 | $3.0 \times 10^{11}$ | $8.0 \times 10^{11}$ | 0.1 | 0.1 |
| 9 | 29 | 30 | $4.7 \times 10^{11}$ | $6.0 \times 10^{11}$ | 0.1 | 0.1 |
| 10 | 30 | 32 | $5.1 \times 10^{11}$ | $7.4 \times 10^{11}$ | 0.3 | 0.3 |
| 11 | 31 | 32 | $2.7 \times 10^{11}$ | $3.0 \times 10^{11}$ | 0.5 | 0.7 |
| 12 | 31 | 33 | $5.0 \times 10^{10}$ | $5.0 \times 10^{11}$ | 0.2 | 0.6 |
| 13 | 30 | 31 | $8.5 \times 10^{10}$ | $7.9 \times 10^{10}$ | 0.1 | 0.1 |
| 14 | 31 | 34 | $3.0 \times 10^{11}$ | $4.0 \times 10^{11}$ | 0.6 | 0.8 |
| 15 | 29 | 32 | $8.6 \times 10^{10}$ | $3.4 \times 10^{11}$ | 0.1 | 0.1 |
| 16 | 30 | 31 | $3.8 \times 10^{11}$ | $4.4 \times 10^{11}$ | 0.1 | 0.2 |
| 17 | 34 | 34 | $5.6 \times 10^{11}$ | $7.4 \times 10^{10}$ | 0.1 | 0.1 |
| 18 | 33 | 33 | $3.6 \times 10^{11}$ | $4.6 \times 10^{11}$ | 0.6 | 0.8 |
| 19 | 31 | 31 | $4.4 \times 10^{11}$ | $3.9 \times 10^{11}$ | 0.1 | 0.1 |
| 20 | 29 | 32 | $1.2 \times 10^{11}$ | $4.3 \times 10^{11}$ | 0.1 | 0.1 |
| 21 | 32 | 33 | $3.0 \times 10^{11}$ | $5.3 \times 10^{11}$ | 0.3 | 0.4 |
| 22 | 31 | 31 | $4.8 \times 10^{10}$ | $4.9 \times 10^{11}$ | 0.1 | 0.1 |
| 23 | 29 | 30 | $4.2 \times 10^{10}$ | $4.2 \times 10^{10}$ | 0.1 | 0.1 |
| 24 | 30 | 30 | $8.7 \times 10^{10}$ | $2.2 \times 10^{11}$ | 0.1 | 0.2 |
| 25 | 33 | 34 | $3.7 \times 10^{9}$ | $4.6 \times 10^{10}$ | 0.1 | 0.1 |
| 26 | 32 | 33 | $4.0 \times 10^{11}$ | $4.8 \times 10^{11}$ | 0.2 | 0.3 |
| 27 | 30 | 31 | $3.3 \times 10^{11}$ | $7.2 \times 10^{11}$ | 0.3 | 0.3 |
| 28 | 28 | 31 | $2.0 \times 10^{11}$ | $1.8 \times 10^{11}$ | 0.1 | 0.1 |
| 29 | 33 | 33 | $5.8 \times 10^{11}$ | $6.2 \times 10^{11}$ | 0.2 | 0.3 |
| 30 | 32 | 32 | $2.4 \times 10^{11}$ | $6.6 \times 10^{11}$ | 0.2 | 0.2 |
| 31 | 33 | 32 | $3.5 \times 10^{11}$ | $5.0 \times 10^{11}$ | 0.3 | 0.5 |
| 32 | 30 | 32 | $4.4 \times 10^{11}$ | $4.9 \times 10^{11}$ | 0.1 | 2.0 |
| 33 | 29 | 34 | $8.2 \times 10^{10}$ | $3.6 \times 10^{11}$ | 0.8 | 1.0 |
| 34 | 31 | 31 | $3.9 \times 10^{11}$ | $5.6 \times 10^{11}$ | 0.1 | 0.1 |
| 35 | 30 | 33 | $3.2 \times 10^{11}$ | $6.0 \times 10^{11}$ | 0.2 | 0.2 |
| 36 | 32 | 34 | $4.5 \times 10^{11}$ | $5.0 \times 10^{11}$ | 0.2 | 0.5 |
| 37 | 30 | 31 | $5.3 \times 10^{11}$ | $6.2 \times 10^{11}$ | 0.1 | 0.3 |
| 38 | 32 | 33 | $3.0 \times 10^{11}$ | $5.6 \times 10^{11}$ | 0.2 | 0.2 |
| 39 | 33 | 33 | $3.9 \times 10^{11}$ | $6.0 \times 10^{11}$ | 0.1 | 0.1 |
| 40 | 29 | 30 | $7.8 \times 10^{10}$ | $2.6 \times 10^{11}$ | 0.1 | 0.1 |
| 41 | 31 | 34 | $3.3 \times 10^{11}$ | $2.9 \times 10^{11}$ | 0.1 | 0.1 |
| 42 | 33 | 31 | $7.5 \times 10^{11}$ | $2.7 \times 10^{11}$ | 0.4 | 0.1 |
| 43 | 33 | 33 | $7.0 \times 10^{11}$ | $6.9 \times 10^{11}$ | 0.3 | 0.2 |
| 44 | 30 | 32 | $6.9 \times 10^{10}$ | $9.7 \times 10^{10}$ | 0.1 | 0.1 |
| 45 | 34 | 32 | $1.6 \times 10^{11}$ | $8.0 \times 10^{10}$ | 0.1 | 0.1 |
| 46 | 30 | 29 | $3.5 \times 10^{11}$ | $1.3 \times 10^{11}$ | 0.1 | 0.1 |
| 47 | 30 | 31 | $5.8 \times 10^{11}$ | $8.4 \times 10^{11}$ | 0.1 | 0.2 |
| 48 | 31 | 32 | $5.0 \times 10^{11}$ | $7.2 \times 10^{11}$ | 0.2 | 0.4 |
| 49 | 35 | 33 | $2.6 \times 10^{10}$ | $2.8 \times 10^{10}$ | 0.1 | 0.1 |
| 50 | 30 | 30 | $3.9 \times 10^{10}$ | $4.0 \times 10^{10}$ | 0.1 | 0.1 |
| 51 | 30 | 30 | $8.3 \times 10^{11}$ | $7.9 \times 10^{11}$ | 0.2 | 0.2 |
| 52 | 33 | 32 | $4.3 \times 10^{11}$ | $7.4 \times 10^{11}$ | 0.2 | 0.7 |
| 53 | 32 | 34 | $5.6 \times 10^{11}$ | $5.8 \times 10^{11}$ | 0.5 | 0.1 |
| 54 | 31 | 33 | $4.0 \times 10^{11}$ | $7.4 \times 10^{11}$ | 0.1 | 0.2 |

TABLE 1—Continued

| Compound number | Contact angle (°) Direct | Contact angle (°) Washed 5 times | Surface resistivity (Ω) Direct | Surface resistivity (Ω) Washed 5 times | Half time of leakage (sec.) Direct | Half time of leakage (sec.) Washed 5 times |
|---|---|---|---|---|---|---|
| 55 | 30 | 33 | $1.6 \times 10^{11}$ | $2.2 \times 10^{11}$ | 0.1 | 0.1 |
| 56 | 34 | 32 | $5.7 \times 10^{11}$ | $2.0 \times 10^{11}$ | 0.1 | 0.1 |
| 57 | 31 | 31 | $1.3 \times 10^{11}$ | $4.3 \times 10^{11}$ | 0.3 | 0.2 |
| 58 | 33 | 31 | $3.5 \times 10^{11}$ | $5.7 \times 10^{11}$ | 0.1 | 0.1 |
| 59 | 27 | 30 | $7.8 \times 10^{10}$ | $3.8 \times 10^{11}$ | 0.1 | 0.3 |
| 60 | 31 | 34 | $3.3 \times 10^{11}$ | $5.6 \times 10^{11}$ | 0.4 | 0.6 |
| 61 | 33 | 31 | $6.8 \times 10^{11}$ | $4.2 \times 10^{11}$ | 0.1 | 0.1 |
| 62 | 30 | 32 | $2.5 \times 10^{11}$ | $4.8 \times 10^{11}$ | 0.4 | 0.4 |
| 63 | 33 | 33 | $4.8 \times 10^{11}$ | $6.3 \times 10^{11}$ | 0.2 | 0.2 |
| 64 | 31 | 31 | $1.7 \times 10^{11}$ | $5.0 \times 10^{11}$ | 0.1 | 0.1 |
| 65 | 32 | 31 | $8.9 \times 10^{10}$ | $1.3 \times 10^{11}$ | 0.1 | 0.1 |
| 66 | 32 | 34 | $8.1 \times 10^{10}$ | $4.4 \times 10^{11}$ | 0.1 | 0.1 |
| 67 | 33 | 33 | $7.5 \times 10^{11}$ | $8.0 \times 10^{11}$ | 0.2 | 0.2 |
| 68 | 32 | 33 | $1.4 \times 10^{11}$ | $5.5 \times 10^{11}$ | 0.1 | 0.2 |
| 69 | 34 | 32 | $5.0 \times 10^{11}$ | $7.5 \times 10^{11}$ | 0.2 | 0.2 |
| 70 | 34 | 31 | $2.0 \times 10^{11}$ | $4.8 \times 10^{11}$ | 0.1 | 0.1 |
| 71 | 32 | 32 | $4.8 \times 10^{11}$ | $7.8 \times 10^{11}$ | 0.1 | 0.1 |
| 72 | 30 | 31 | $1.5 \times 10^{11}$ | $7.0 \times 10^{11}$ | 0.1 | 0.1 |
| 73 | 31 | 30 | $7.7 \times 10^{11}$ | $5.0 \times 10^{11}$ | 0.1 | 0.1 |
| 74 | 31 | 32 | $2.8 \times 10^{11}$ | $6.5 \times 10^{11}$ | 0.1 | 0.1 |
| 75 | 34 | 33 | $9.0 \times 10^{10}$ | $3.3 \times 10^{11}$ | 0.1 | 0.1 |
| 76 | 33 | 33 | $2.8 \times 10^{11}$ | $8.4 \times 10^{11}$ | 0.1 | 0.2 |
| 77 | 30 | 32 | $1.5 \times 10^{11}$ | $6.0 \times 10^{11}$ | 0.1 | 0.1 |
| 78 | 33 | 32 | $8.0 \times 10^{11}$ | $9.2 \times 10^{11}$ | 0.2 | 0.2 |

EXAMPLE 2

The films obtained from Example 1 were each dipped for 30 minutes at 30° C. in a soiled bath (0.02% carbon, 0.1% beef tallow, 0.1% liquid paraffin, 0.2% household heavy detergent, the remainder water). After drying, the degree of soiling of the films was determined. The result is shown in Table 2. Soil Additional Density (SAD) was calculated from the following equation, utilizing the reflectance readings of the films:

$$SAD = \log_{10} \frac{\text{reflectance of original film}}{\text{reflectance of soiled film}}$$

From Table 2, it is noted that those nylon films added with the compounds of the present invention show a marked decrease in the degree of soiling, demonstrating the desirable resistance to wet soiling of the modifying agents of the present invention.

TABLE 2

| Compound No. | SAD ($\times 10^{-3}$) | Compound No. | SAD ($\times 10^{-3}$) |
|---|---|---|---|
| Blank test | 250 | 31 | 50 |
| 1 | 52 | 32 | 56 |
| 2 | 46 | 33 | 45 |
| 3 | 50 | 34 | 57 |
| 4 | 44 | 35 | 57 |
| 5 | 49 | 36 | 55 |
| 6 | 47 | 37 | 50 |
| 7 | 51 | 38 | 52 |
| 8 | 52 | 39 | 49 |
| 9 | 52 | 40 | 50 |
| 10 | 50 | 41 | 52 |
| 11 | 49 | 42 | 52 |
| 12 | 44 | 43 | 59 |
| 13 | 47 | 44 | 57 |
| 14 | 47 | 45 | 50 |
| 15 | 45 | 46 | 48 |
| 16 | 45 | 47 | 53 |
| 17 | 45 | 48 | 52 |
| 18 | 54 | 49 | 55 |
| 19 | 53 | 50 | 50 |
| 20 | 50 | 51 | 57 |
| 21 | 47 | 52 | 57 |
| 22 | 51 | 53 | 55 |
| 23 | 51 | 54 | 58 |
| 24 | 50 | 55 | 57 |
| 25 | 47 | 56 | 49 |
| 26 | 44 | 57 | 50 |
| 27 | 48 | 58 | 50 |
| 28 | 45 | 59 | 55 |
| 29 | 59 | 60 | 57 |
| 30 | 55 | 61 | 48 |
| 62 | 50 | 71 | 53 |
| 63 | 55 | 72 | 53 |
| 64 | 55 | 73 | 57 |
| 65 | 49 | 74 | 55 |
| 66 | 49 | 75 | 51 |
| 67 | 56 | 76 | 51 |
| 68 | 50 | 77 | 53 |
| 69 | 52 | 78 | 54 |
| 70 | 49 | | |

EXAMPLE 3

10 parts, by weight, of polyacrylonitrile was dissolved in 100 parts of dimethyl formamide. To the respective batches of this solution were added 0.1 part each of the compounds shown in Example 1, respectively, followed by thorough stirring to mix them well. Thereafter, each mixed solution was allowed to flow on a glass plate to produce a film of 0.02 mm. in thickness. The films thus prepared were measured of their critical surface tension and also of the degree of soiling which was conducted in the method employed in Example 2. The result is as shown in Table 3. The critical surface tension of polyacrylonitrile films shows a marked improvement as a result of the addition of the compounds of the present invention. The surface polarity of the films is noted to be highly enhanced, and the resistance to wet soiling of these films is seen to be greatly improved.

TABLE 3

| Compound number | Critical surface tension (dyne/cm., 20° C.) | SAD ($\times 10^{-3}$) | Compound number | Critical surface tension (dyne/cm., 20° C.) | SAD ($\times 10^{-3}$) |
|---|---|---|---|---|---|
| Blank test | 34 | 156 | 40 | 38 | 50 |
| 1 | 40 | 50 | 41 | 37 | 49 |
| 2 | 39 | 41 | 42 | 40 | 52 |
| 3 | 43 | 52 | 43 | 41 | 59 |
| 4 | 38 | 44 | 44 | 41 | 55 |
| 5 | 39 | 44 | 45 | 43 | 50 |
| 6 | 42 | 50 | 46 | 39 | 54 |
| 7 | 41 | 48 | 47 | 39 | 50 |
| 8 | 41 | 48 | 48 | 40 | 51 |
| 9 | 41 | 47 | 49 | 44 | 57 |
| 10 | 38 | 49 | 50 | 43 | 55 |
| 11 | 41 | 52 | 51 | 39 | 55 |
| 12 | 41 | 52 | 52 | 40 | 58 |
| 13 | 40 | 50 | 53 | 38 | 50 |
| 14 | 41 | 47 | 54 | 39 | 52 |
| 15 | 39 | 44 | 55 | 39 | 54 |
| 16 | 42 | 48 | 56 | 38 | 49 |
| 17 | 42 | 44 | 57 | 42 | 58 |
| 18 | 42 | 51 | 58 | 43 | 51 |
| 19 | 40 | 50 | 59 | 44 | 50 |
| 20 | 41 | 52 | 60 | 40 | 55 |
| 21 | 39 | 48 | 61 | 41 | 59 |
| 22 | 41 | 48 | 62 | 38 | 58 |
| 23 | 39 | 50 | 63 | 42 | 55 |
| 24 | 39 | 50 | 64 | 42 | 55 |
| 25 | 39 | 50 | 65 | 40 | 50 |
| 26 | 40 | 52 | 66 | 39 | 57 |
| 27 | 42 | 49 | 67 | 40 | 52 |
| 28 | 40 | 52 | 68 | 40 | 50 |
| 29 | 40 | 56 | 69 | 38 | 54 |
| 30 | 41 | 49 | 70 | 39 | 54 |
| 31 | 40 | 53 | 71 | 38 | 55 |
| 32 | 41 | 53 | 72 | 38 | 51 |
| 33 | 42 | 50 | 73 | 38 | 51 |
| 34 | 40 | 47 | 74 | 40 | 50 |
| 35 | 39 | 47 | 75 | 42 | 53 |
| 36 | 39 | 54 | 76 | 41 | 56 |
| 37 | 43 | 51 | 77 | 41 | 53 |
| 38 | 41 | 54 | 78 | 39 | 52 |
| 39 | 41 | 50 | | | |

EXAMPLE 4

To the respective batches each being 100 parts, by weight, of chips of nylon 6 were added 2.5 parts each of the compounds used in Example 1, respectively, and they were mixed well. Thereafter, these respective mixtures were subjected to extrusion spinning to produce monofilaments, each being of a fineness of about 20 denier. These monofilaments were measured to determine their surface resistivity and their half time of leakage in the method employed in Example 1. Furthermore, their frictional coefficient was determined by relying on the Röder method. The result is as shown in Table 4. It is noted from this Table that the compounds of the present invention are useful in such a way that the two groups of nylon 6, one of which being added with the said compounds prior to polymerization and the other being added with same after polymerization, both show equally desirably improved surface properties. In addition, as demonstrated also by the data with respect to frictional coefficient, the compounds are noted to have imparted soft feel to the nylon 6.

TABLE 4

| Compound number | Surface resistivity ($\Omega$) | Half time of leakage (sec.) | Frictional coefficient $\mu S$ | Frictional coefficient $\mu d$ 120 |
|---|---|---|---|---|
| Blank test | >10$^{15}$ | ∞ | 0.482 | 0.395 |
| 1 | 4.5×10$^{11}$ | 0.2 | 0.290 | 0.288 |
| 2 | 7.2×10$^{11}$ | 0.2 | 0.291 | 0.288 |
| 3 | 6.0×10$^{11}$ | 0.1 | 0.289 | 0.286 |
| 4 | 9.8×10$^{10}$ | 0.1 | 0.289 | 0.286 |
| 5 | 1.5×10$^{11}$ | 0.1 | 0.289 | 0.286 |
| 6 | 4.2×10$^{11}$ | 0.1 | 0.290 | 0.290 |
| 7 | 9.0×10$^{11}$ | 0.2 | 0.291 | 0.286 |
| 8 | 7.8×10$^{11}$ | 0.2 | 0.291 | 0.288 |
| 9 | 6.1×10$^{11}$ | 0.1 | 0.292 | 0.290 |
| 10 | 7.0×10$^{11}$ | 0.1 | 0.295 | 0.290 |
| 11 | 1.5×10$^{11}$ | 0.1 | 0.284 | 0.290 |
| 12 | 2.8×10$^{11}$ | 0.1 | 0.300 | 0.287 |
| 13 | 9.0×10$^{10}$ | 0.3 | 0.298 | 0.288 |
| 14 | 7.7×10$^{10}$ | 0.1 | 0.301 | 0.292 |
| 15 | 6.0×10$^{10}$ | 0.1 | 0.297 | 0.290 |
| 16 | 5.5×10$^{11}$ | 0.1 | 0.292 | 0.291 |
| 17 | 4.0×10$^{11}$ | 0.1 | 0.292 | 0.290 |
| 18 | 2.5×10$^{11}$ | 0.1 | 0.304 | 0.298 |
| 19 | 7.8×10$^{11}$ | 0.2 | 0.300 | 0.294 |
| 20 | 2.7×10$^{11}$ | 0.1 | 0.300 | 0.298 |
| 21 | 5.4×10$^{11}$ | 0.1 | 0.302 | 0.298 |
| 22 | 4.0×10$^{11}$ | 0.1 | 0.294 | 0.290 |
| 23 | 9.5×10$^{11}$ | 0.2 | 0.297 | 0.295 |
| 24 | 2.3×10$^{11}$ | 0.1 | 0.290 | 0.290 |
| 25 | 6.5×10$^{11}$ | 0.2 | 0.298 | 0.297 |
| 26 | 4.0×10$^{11}$ | 0.1 | 0.295 | 0.290 |
| 27 | 7.0×10$^{11}$ | 0.2 | 0.294 | 0.290 |
| 28 | 5.5×10$^{11}$ | 0.1 | 0.290 | 0.290 |
| 29 | 9.0×10$^{10}$ | 0.1 | 0.307 | 0.302 |
| 30 | 1.4×10$^{11}$ | 0.1 | 0.301 | 0.297 |
| 31 | 7.0×10$^{11}$ | 0.2 | 0.302 | 0.295 |
| 32 | 6.2×10$^{11}$ | 0.2 | 0.297 | 0.295 |
| 33 | 8.0×10$^{11}$ | 0.2 | 0.290 | 0.290 |
| 34 | 3.8×10$^{11}$ | 0.2 | 0.291 | 0.290 |
| 35 | 6.0×10$^{11}$ | 0.2 | 0.296 | 0.291 |
| 36 | 7.5×10$^{10}$ | 0.1 | 0.296 | 0.292 |
| 37 | 9.5×10$^{10}$ | 0.1 | 0.299 | 0.295 |
| 38 | 6.0×10$^{11}$ | 0.1 | 0.299 | 0.295 |
| 39 | 8.0×10$^{11}$ | 0.20 | 0.295 | 0.290 |
| 40 | 5.7×10$^{11}$ | 0.2 | 0.294 | 0.290 |
| 41 | 8.8×10$^{11}$ | 0.1 | 0.295 | 0.290 |
| 42 | 9.0×10$^{11}$ | 0.2 | 0.295 | 0.292 |
| 43 | 3.3×10$^{11}$ | 0.1 | 0.301 | 0.295 |
| 44 | 7.0×10$^{11}$ | 0.1 | 0.298 | 0.290 |
| 45 | 8.5×10$^{10}$ | 0.1 | 0.305 | 0.295 |
| 46 | 6.0×10$^{11}$ | 0.2 | 0.297 | 0.292 |
| 47 | 5.7×10$^{11}$ | 0.2 | 0.295 | 0.292 |
| 48 | 4.0×10$^{11}$ | 0.1 | 0.299 | 0.292 |
| 49 | 6.0×10$^{11}$ | 0.2 | 0.292 | 0.288 |
| 50 | 5.4×10$^{11}$ | 0.2 | 0.304 | 0.300 |
| 51 | 3.0×10$^{11}$ | 0.1 | 0.300 | 0.298 |
| 52 | 3.0×10$^{11}$ | 0.1 | 0.295 | 0.298 |
| 53 | 7.0×10$^{11}$ | 0.2 | 0.299 | 0.290 |
| 54 | 9.5×10$^{11}$ | 0.2 | 0.300 | 0.289 |
| 55 | 1.5×10$^{12}$ | 0.4 | 0.304 | 0.295 |
| 56 | 8.4×10$^{11}$ | 0.2 | 0.306 | 0.295 |
| 57 | 7.0×10$^{11}$ | 0.1 | 0.298 | 0.290 |
| 58 | 7.7×10$^{11}$ | 0.1 | 0.295 | 0.288 |
| 59 | 6.0×10$^{11}$ | 0.1 | 0.298 | 0.288 |
| 60 | 4.4×10$^{11}$ | 0.1 | 0.302 | 0.290 |
| 61 | 2.7×10$^{11}$ | 0.1 | 0.295 | 0.290 |
| 62 | 2.0×10$^{11}$ | 0.1 | 0.299 | 0.290 |
| 63 | 4.0×10$^{11}$ | 0.1 | 0.299 | 0.289 |
| 64 | 6.0×10$^{11}$ | 0.2 | 0.298 | 0.290 |
| 65 | 5.4×10$^{11}$ | 0.1 | 0.308 | 0.295 |
| 66 | 7.0×10$^{11}$ | 0.2 | 0.302 | 0.295 |
| 67 | 7.0×10$^{11}$ | 0.2 | 0.304 | 0.300 |
| 68 | 5.2×10$^{11}$ | 0.1 | 0.300 | 0.302 |
| 69 | 5.8×10$^{11}$ | 0.1 | 0.311 | 0.300 |
| 70 | 1.5×10$^{11}$ | 0.1 | 0.315 | 0.298 |
| 71 | 2.0×10$^{11}$ | 0.1 | 0.302 | 0.297 |
| 72 | 6.4×10$^{11}$ | 0.2 | 0.298 | 0.285 |
| 73 | 7.0×10$^{11}$ | 0.2 | 0.302 | 0.300 |
| 74 | 8.5×10$^{11}$ | 0.2 | 0.300 | 0.290 |
| 75 | 2.8×10$^{11}$ | 0.1 | 0.310 | 0.298 |
| 76 | 9.0×10$^{11}$ | 0.2 | 0.305 | 0.300 |
| 77 | 2.8×10$^{11}$ | 0.1 | 0.300 | 0.285 |
| 78 | 4.0×10$^{11}$ | 0.1 | 0.300 | 0.298 |

EXAMPLE 5

The respective batches of 100 parts, by weight, of various kinds of synthetic high polymers were mixed with the compounds Nos. 2, 5, 14, 17, 27, 28, 33, 35, 40, 45, 55 and 62 of Example 1, respectively, thereafter subjecting them to extrusion molding to produce articles in the form of sheet.

The antistatic property of these sheets shows a great improvement as is noted from the following Table 5.

TABLE 5

| Synthetic high polymer | Compound number | Amount of compound added (wt. percent) | Surface resistivity ($\Omega$) | Half time of leakage (sec.) |
|---|---|---|---|---|
| Low density polyethylene. | Blank test | | >10$^{15}$ | ∞ |
| | 2 | 0.10 | 7.0×10$^{11}$ | 0.2 |
| | | 0.15 | 8.5×10$^{10}$ | 0.1 |
| | 5 | 0.10 | 4.5×10$^{11}$ | 0.1 |
| | | 0.15 | 1.2×10$^{11}$ | 0.1 |
| | 14 | 0.10 | 9.0×10$^{11}$ | 0.2 |
| | | 0.15 | 2.7×10$^{11}$ | 0.1 |
| | 17 | 0.10 | 5.0×10$^{11}$ | 0.1 |
| | | 0.15 | 7.5×10$^{10}$ | 0.1 |
| | 27 | 0.10 | 6.4×10$^{11}$ | 0.2 |
| | | 0.15 | 7.7×10$^{10}$ | 0.1 |
| | 28 | 0.10 | 8.0×10$^{11}$ | 0.2 |
| | | 0.15 | 2.3×10$^{11}$ | 0.1 |
| | 33 | 0.10 | 6.0×10$^{11}$ | 0.1 |
| | | 0.15 | 5.2×10$^{10}$ | 0.1 |
| | 35 | 0.10 | 8.5×10$^{11}$ | 0.2 |
| | | 0.15 | 2.0×10$^{11}$ | 0.1 |
| | 40 | 0.10 | 7.5×10$^{11}$ | 0.2 |
| | | 0.15 | 2.4×10$^{11}$ | 0.1 |
| | 45 | 0.10 | 4.9×10$^{11}$ | 0.1 |
| | | 0.15 | 9.5×10$^{10}$ | 0.1 |
| | 55 | 0.10 | 7.5×10$^{11}$ | 0.2 |
| | | 0.15 | 8.5×10$^{10}$ | 0.1 |
| | 62 | 0.10 | 4.5×10$^{11}$ | 0.1 |
| | | 0.15 | 1.7×10$^{11}$ | 0.1 |
| | 67 | 0.10 | 2.7×10$^{11}$ | 0.1 |
| | | 0.15 | 8.0×10$^{11}$ | 0.1 |
| | 73 | 0.10 | 5.5×10$^{11}$ | 0.1 |
| | | 0.15 | 1.2×10$^{11}$ | 0.1 |
| High density polyethylene. | Blank test | | >10$^{15}$ | ∞ |
| | 2 | 0.3 | 8.5×10$^{11}$ | 0.2 |
| | | 0.5 | 4.1×10$^{11}$ | 0.1 |
| | 5 | 0.3 | 7.0×10$^{11}$ | 0.2 |
| | | 0.5 | 5.2×10$^{11}$ | 0.1 |
| | 14 | 0.3 | 9.0×10$^{11}$ | 0.2 |
| | | 0.5 | 1.8×10$^{11}$ | 0.1 |
| | 17 | 0.3 | 6.0×10$^{11}$ | 0.2 |
| | | 0.5 | 3.2×10$^{11}$ | 0.1 |
| | 27 | 0.3 | 8.8×10$^{11}$ | 0.2 |
| | | 0.5 | 4.0×10$^{10}$ | 0.1 |
| | 28 | 0.3 | 5.8×10$^{11}$ | 0.2 |
| | | 0.5 | 1.5×10$^{11}$ | 0.1 |
| | 33 | 0.3 | 6.0×10$^{11}$ | 0.1 |
| | | 0.5 | 2.5×10$^{11}$ | 0.1 |
| | 35 | 0.3 | 9.5×10$^{11}$ | 0.2 |
| | | 0.5 | 6.0×10$^{11}$ | 0.2 |
| | 40 | 0.3 | 7.4×10$^{11}$ | 0.2 |
| | | 0.5 | 4.0×10$^{11}$ | 0.1 |
| | 45 | 0.3 | 5.0×10$^{11}$ | 0.1 |
| | | 0.5 | 1.2×10$^{11}$ | 0.1 |
| | 55 | 0.3 | 8.5×10$^{11}$ | 0.2 |
| | | 0.5 | 4.9×10$^{11}$ | 0.1 |
| | 62 | 0.3 | 7.8×10$^{11}$ | 0.2 |
| | | 0.5 | 5.0×10$^{11}$ | 0.1 |
| | 67 | 0.3 | 7.5×10$^{11}$ | 0.2 |
| | | 0.5 | 5.0×10$^{11}$ | 0.1 |
| | 73 | 0.3 | 4.7×10$^{11}$ | 0.1 |
| | | 0.5 | 1.8×10$^{11}$ | 0.1 |

TABLE 5—Continued

| Synthetic high polymer | Compound number | Amount of compound added (wt. percent) | Surface resistivity (Ω) | Half time of leakage (sec.) |
|---|---|---|---|---|
| Polypropylene | Blank test | | >10¹⁵ | ∞ |
| | 2 | 0.3 | 6.6×10¹¹ | 0.2 |
| | | 0.5 | 2.5×10¹¹ | 0.1 |
| | 5 | 0.3 | 4.2×10¹¹ | 0.1 |
| | | 0.5 | 9.0×10¹⁰ | 0.1 |
| | 14 | 0.3 | 7.5×10¹¹ | 0.2 |
| | | 0.5 | 1.8×10¹¹ | 0.1 |
| | 17 | 0.3 | 6.0×10¹¹ | 0.1 |
| | | 0.5 | 3.8×10¹¹ | 0.1 |
| | 27 | 0.3 | 8.0×10¹¹ | 0.2 |
| | | 0.5 | 5.4×10¹⁰ | 0.1 |
| | 28 | 0.3 | 6.0×10¹¹ | 0.2 |
| | | 0.5 | 2.0×10¹¹ | 0.1 |
| | 33 | 0.3 | 4.2×10¹¹ | 0.1 |
| | | 0.5 | 7.5×10¹⁰ | 0.1 |
| | 35 | 0.3 | 7.0×10¹¹ | 0.2 |
| | | 0.5 | 2.4×10¹¹ | 0.1 |
| | 40 | 0.3 | 5.0×10¹¹ | 0.1 |
| | | 0.5 | 1.8×10¹¹ | 0.1 |
| | 45 | 0.3 | 5.8×10¹¹ | 0.2 |
| | | 0.5 | 8.5×10¹⁰ | 0.1 |
| | 55 | 0.3 | 9.0×10¹¹ | 0.2 |
| | | 0.5 | 1.4×10¹¹ | 0.1 |
| | 62 | 0.3 | 5.5×10¹¹ | 0.1 |
| | | 0.5 | 9.0×10¹⁰ | 0.1 |
| | 67 | 0.3 | 5.0×10¹¹ | 0.1 |
| | | 0.5 | 2.8×10¹¹ | 0.1 |
| | 73 | 0.3 | 4.9×10¹¹ | 0.1 |
| | | 0.5 | 1.5×10¹¹ | 0.1 |
| Hard polyvinyl chloride | Blank test | | >10¹⁵ | ∞ |
| | 2 | 1.0 | 8.5×10¹¹ | 0.2 |
| | | 2.0 | 3.7×10¹¹ | 0.1 |
| | 5 | 1.0 | 7.7×10¹¹ | 0.2 |
| | | 2.0 | 1.2×10¹¹ | 0.1 |
| | 14 | 1.0 | 9.0×10¹¹ | 0.2 |
| | | 2.0 | 2.4×10¹¹ | 0.1 |
| | 17 | 1.0 | 7.8×10¹¹ | 0.2 |
| | | 2.0 | 3.0×10¹¹ | 0.1 |
| | 27 | 1.0 | 8.5×10¹¹ | 0.2 |
| | | 2.0 | 4.1×10¹¹ | 0.1 |
| | 28 | 1.0 | 7.0×10¹¹ | 0.1 |
| | | 2.0 | 1.8×10¹¹ | 0.1 |
| | 33 | 1.0 | 6.0×10¹¹ | 0.1 |
| | | 2.0 | 2.2×10¹¹ | 0.1 |
| | 35 | 1.0 | 4.4×10¹¹ | 0.1 |
| | | 2.0 | 1.8×10¹¹ | 0.1 |
| | 40 | 1.0 | 5.2×10¹¹ | 0.1 |
| | | 2.0 | 1.6×10¹¹ | 0.1 |
| | 45 | 1.0 | 6.9×10¹¹ | 0.2 |
| | | 2.0 | 4.0×10¹¹ | 0.1 |
| | 55 | 1.0 | 7.9×10¹¹ | 0.2 |
| | | 2.0 | 3.7×10¹¹ | 0.1 |
| | 62 | 1.0 | 9.2×10¹¹ | 0.2 |
| | | 2.0 | 2.0×10¹¹ | 0.1 |
| | 67 | 1.0 | 8.4×10¹¹ | 0.2 |
| | | 2.0 | 4.0×10¹¹ | 0.1 |
| | 73 | 1.0 | 7.0×10¹¹ | 0.2 |
| | | 2.0 | 3.8×10¹¹ | 0.1 |
| Polystyrene | Blank test | | >10¹⁵ | ∞ |
| | 2 | 1.5 | 8.5×10¹¹ | 0.2 |
| | | 2.0 | 4.0×10¹¹ | 0.1 |
| | 5 | 1.5 | 5.8×10¹¹ | 0.2 |
| | | 2.0 | 1.4×10¹¹ | 0.1 |
| | 14 | 1.5 | 7.2×10¹¹ | 0.3 |
| | | 2.0 | 2.0×10¹¹ | 0.1 |
| | 17 | 1.5 | 8.8×10¹¹ | 0.2 |
| | | 2.0 | 3.8×10¹¹ | 0.1 |
| | 27 | 1.5 | 9.4×10¹¹ | 0.3 |
| | | 2.0 | 4.0×10¹¹ | 0.1 |
| | 28 | 1.5 | 6.8×10¹¹ | 0.2 |
| | | 2.0 | 4.0×10¹¹ | 0.1 |
| | 33 | 1.5 | 8.8×10¹¹ | 0.2 |
| | | 2.0 | 2.0×10¹¹ | 0.1 |
| | 35 | 1.5 | 5.0×10¹¹ | 0.1 |
| | | 2.0 | 1.7×10¹¹ | 0.1 |
| | 40 | 1.5 | 6.6×10¹¹ | 0.2 |
| | | 2.0 | 1.8×10¹¹ | 0.1 |
| | 45 | 1.5 | 7.9×10¹¹ | 0.2 |
| | | 2.0 | 2.4×10¹¹ | 0.1 |
| | 55 | 1.5 | 4.0×10¹¹ | 0.1 |
| | | 2.0 | 1.1×10¹¹ | 0.1 |
| | 62 | 1.5 | 8.5×10¹¹ | 0.2 |
| | | 2.0 | 2.2×10¹¹ | 0.1 |
| | 67 | 1.5 | 1.8×10¹¹ | 0.1 |
| | | 2.0 | 8.0×10¹⁰ | 0.1 |
| | 73 | 1.5 | 5.5×10¹¹ | 0.1 |
| | | 2.0 | 2.0×10¹¹ | 0.1 |
| Acrylonitrilebutadienestyrene copolymer (ABS resin) | Blank test | | >10¹⁵ | ∞ |
| | 2 | 1.0 | 7.0×10¹¹ | 0.2 |
| | | 2.0 | 4.2×10¹¹ | 0.1 |
| | 5 | 1.0 | 5.9×10¹¹ | 0.1 |
| | | 2.0 | 2.0×10¹¹ | 0.1 |
| | 14 | 1.0 | 6.8×10¹¹ | 0.2 |
| | | 2.0 | 2.8×10¹¹ | 0.1 |
| | 17 | 1.0 | 6.5×10¹¹ | 0.2 |
| | | 2.0 | 1.4×10¹¹ | 0.1 |
| | 27 | 1.0 | 7.0×10¹¹ | 0.2 |
| | | 2.0 | 9.4×10¹⁰ | 0.1 |
| | 28 | 1.0 | 6.5×10¹¹ | 0.2 |
| | | 2.0 | 2.5×10¹¹ | 0.1 |
| | 33 | 1.0 | 1.5×10¹² | 0.3 |
| | | 2.0 | 4.8×10¹¹ | 0.1 |
| | 35 | 1.0 | 7.0×10¹¹ | 0.2 |
| | | 2.0 | 1.8×10¹¹ | 0.1 |
| | 40 | 1.0 | 8.8×10¹¹ | 0.2 |
| | | 2.0 | 4.0×10¹¹ | 0.1 |
| | 45 | 1.0 | 5.8×10¹¹ | 0.2 |
| | | 2.0 | 1.2×10¹¹ | 0.1 |
| | 55 | 1.0 | 7.5×10¹¹ | 0.2 |
| | | 2.0 | 1.8×10¹¹ | 0.1 |
| | 62 | 1.0 | 8.3×10¹¹ | 0.2 |
| | | 2.0 | 5.0×10¹¹ | 0.1 |
| | 67 | 1.0 | 8.5×10¹¹ | 0.2 |
| | | 2.0 | 5.0×10¹¹ | 0.1 |
| | 73 | 1.0 | 7.0×10¹¹ | 0.2 |
| | | 2.0 | 4.0×10¹¹ | 0.1 |
| Polymethyl methacrylate | Blank test | | >10¹⁵ | ∞ |
| | 2 | 1.0 | 7.7×10¹¹ | 0.2 |
| | | 2.0 | 4.0×10¹¹ | 0.1 |
| | 5 | 1.0 | 8.4×10¹¹ | 0.2 |
| | | 2.0 | 3.7×10¹¹ | 0.1 |

TABLE 5—Continued

| Synthetic high polymer | Compound number | Amount of compound added (wt. percent) | Surface resistivity (Ω) | Half time of leakage (sec.) |
|---|---|---|---|---|
| | 14 | 1.0 | $6.0 \times 10^{11}$ | 0.2 |
| | | 2.0 | $2.9 \times 10^{11}$ | 0.1 |
| | 17 | 1.0 | $7.6 \times 10^{11}$ | 0.2 |
| | | 2.0 | $2.8 \times 10^{11}$ | 0.1 |
| | 27 | 1.0 | $5.7 \times 10^{11}$ | 0.1 |
| | | 2.0 | $2.0 \times 10^{11}$ | 0.1 |
| | 28 | 1.0 | $2.7 \times 10^{12}$ | 0.3 |
| | | 2.0 | $1.8 \times 10^{11}$ | 0.1 |
| | 33 | 1.0 | $7.4 \times 10^{11}$ | 0.2 |
| | | 2.0 | $2.5 \times 10^{10}$ | 0.1 |
| | 35 | 1.0 | $6.5 \times 10^{11}$ | 0.2 |
| | | 2.0 | $4.0 \times 10^{11}$ | 0.1 |
| | 40 | 1.0 | $8.5 \times 10^{11}$ | 0.2 |
| | | 2.0 | $4.0 \times 10^{11}$ | 0.1 |
| | 45 | 1.0 | $9.2 \times 10^{11}$ | 0.2 |
| | | 2.0 | $5.2 \times 10^{11}$ | 0.1 |
| | 55 | 1.0 | $7.4 \times 10^{11}$ | 0.1 |
| | | 2.0 | $2.3 \times 10^{11}$ | 0.1 |
| | 62 | 1.0 | $6.5 \times 10^{11}$ | 0.2 |
| | | 2.0 | $1.9 \times 10^{11}$ | 0.1 |
| | 67 | 1.0 | $7.0 \times 10^{11}$ | 0.2 |
| | | 2.0 | $2.5 \times 10^{11}$ | 0.1 |
| | 73 | 1.0 | $8.4 \times 10^{11}$ | 0.2 |
| | | 2.0 | $3.3 \times 10^{11}$ | 0.1 |

I claim:

1. A surface modifier for synthetic high polymers which is a compound expressed by the general formula:

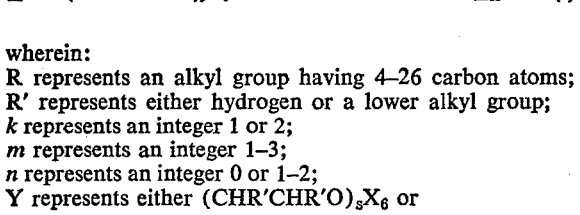

(I)

wherein:
R represents an alkyl group having 4–26 carbon atoms;
R' represents either hydrogen or a lower alkyl group;
$k$ represents an integer 1 or 2;
$m$ represents an integer 1–3;
$n$ represents an integer 0 or 1–2;
Y represents either $(CHR'CHR'O)_s X_6$ or

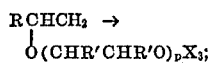

$p, q, r, s$ each represent an integer 0–100;
$X_3$ is hydrogen;
$X_1, X_2, X_4, X_5$ and $X_6$ each represent either hydrogen or $(CH_2)_l COO$ wherein $l$ represents an integer 1–3;
at least one of $X_1, X_2$ and $X_4$ is required to be $(CH_2)_1 COO$ and there are not over three $(CH_2)_1 COO$ groups in the molecule with the proviso that $X_4, X_5$ and $X_6$ can be $(CH_2)_1 COO$ only when the corresponding $q$, $r$, or $s$ is 0;
or $X_1$ and $X_2$ may be nothing;
in case $X_1$ or $X_2$ are nothing, there is present no OH group which is bonded to the corresponding nitrogen atom;
M represents a metal selected from the group consisting of Ca, Mg, Zn, Ba, Ni, Mn, Al, Fe, Sn, Pb, Cu and Co or an organic amine selected from the group consisting of diethanolamine and triethanolamine;
$x$ and $y$ each represent an integer determined by the valency of the metal when M is the said metal or is 1 when M is said amine, and $(CH_2)_1 COO$ group not attached to M is attached to hydrogen.

2. A surface modifier for synthetic high polymers which is an acid salt of a compound of said general formula (I) stated in claim 1, the said acid salt being an acid metal salt of amphoteric surface active agent expressed by the general formula II given below:

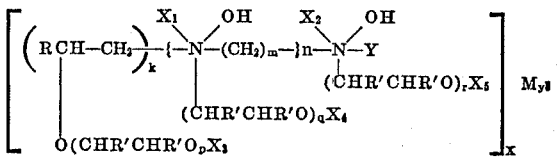

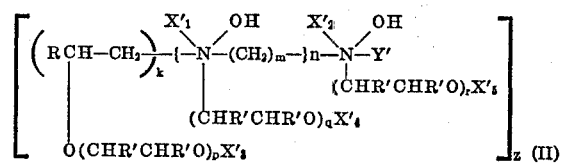

(II)

wherein:
R represents a hydrocarbon group having 4–26 carbon atoms;
R' represents either hydrogen or a lower alkyl group;
$k$ represents an integer 1 or 2;
$m$ represents an integer 1–3;
$n$ represents an integer 0 or 1–2;
Y represents either $(CHR'CHR'O)_s X_6$ or

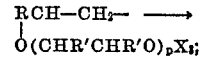

Y' represents either $(CHR'CHR'O)_s X_6$ or

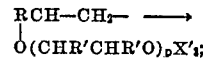

$p, q, r, s$, each represent an integer 0–100;
$X_3$ is hydrogen;
$X_1, X_2, X_4, X_5$ and $X_6$ each represent either hydrogen or $(CH_2)_l COO$ wherein $l$ represents an integer 1–3 with the proviso that $X_4, X_5$ and $X_6$ can be $(CH_2)_1 COO$ only when the corresponding $q, r,$ or $s$ is 0;
$X'_3$ is hydrogen;
$X'_1, X'_2, X'_4, X'_5$ and $X'_6$ are hydrogen or $(CH_2)_1 COOH$ with the proviso that $X'_4, X'_5$ and $X'_6$ can be $(CH_2)_1 COOH$ only when the corresponding $q, r$ or $s$ is 0, $l$ represents an integer from 1–3;
at least one of $X_1, X'_1, X_2, X'_2, X_4, X'_4, X_5, X'_5, X_6, X'_6$ is required to be $(CH_2)_1 COO$ if the X component and $(CH_2)_1 COOH$ if the X' component is present and there are not over three $(CH_2)_1 COO$ groups in the molecule, with the further proviso that $X_1, X'_1,$ and $X_2, X'_2$ can be nothing and with the further proviso that when $X_1, X'_1$ or $X_2, X'_2$ are nothing, there is present no OH group which is bonded to the corresponding nitrogen atom;
M represents a metal selected from the group consisting of Ca, Mg, Zn, Ba, Ni, Mn, Al, Fe, Sn, Pb, Cu, and Co; and
$x$, $y$ and $z$ represent an integer determined by the valency of the metal.

3. A surface modifier according to claim 2 which is a mixture of said acid salt of formula II and of a neutral salt of formula I.

4. A surface modifier for synthetic high polymers according to claim 1, in which the said M is a metal selected from the group consisting of calcium, magnesium, zinc, nickel, lead, tin, iron, copper, aluminum, manganese, cobalt and barium.

5. A surface modifier for synthetic high polymers according to claim 1, in which the said M is an organic amine selected from the group consisting of diethanol amine and triethanol amine.

6. A surface modifier according to claim 1 wherein $n$ is zero.

7. A surface modifier according to claim 2 wherein $n$ is zero.

8. A surface modifier according to claim 1 wherein $n$ is 1 and $m$ is 2 or 3.

9. A surface modifier according to claim 2 wherein $n$ is 1 and $m$ is 2 or 3.

10. A surface modifier according to claim 1 wherein $n$ is 2 and $m$ is 2.

11. A surface modifier according to claim 2 wherein $n$ is 2 and $m$ is 2.

12. A surface modifier according to claim 2 wherein $p$, $q$, $r$ and $s$ are each an integer ranging from 0 to 50.

13. A surface modifier according to claim 2 wherein $p$, $q$, $r$ and $s$ are each an integer ranging from 0 to 50.

References Cited
UNITED STATES PATENTS

| | | | |
|---|---|---|---|
| 2,967,755 | 1/1961 | Keller | 260—567.6 P |
| 3,200,155 | 8/1965 | Kirkpatrick | 260—584 B |
| 3,297,652 | 1/1967 | Tomiyama et al. | 260—429 R |
| 3,297,653 | 1/1967 | Tomiyama et al. | 260—429 R |
| 3,426,029 | 2/1969 | Beavers et al. | 260—567.6 P |
| 3,445,440 | 5/1969 | Susi et al. | 260—567.6 P |
| 3,448,128 | 6/1969 | Marumo et al. | 260—429 R |
| 3,555,079 | 1/1971 | Marumo et al. | 260—501.13 |
| 3,636,114 | 1/1972 | Tobler et al. | 260—584 B |

DANIEL E. WYMAN, Primary Examiner

A. P. DEMERS, Assistant Examiner

U.S. Cl. X.R.

8—178 R; 106—13; 252—357, 403; 260—78 R, 89.5 R, 75 R, 91.3 R, 92.8 R, 93.5 R, 94.2 R, 429 J, 429.7